(12) United States Patent
Pfeiffer et al.

(10) Patent No.: US 8,580,952 B2
(45) Date of Patent: Nov. 12, 2013

(54) GLYOXAL FREE PURIFIED CATIONIC POLYGALACTOMANNAN

(75) Inventors: Ugo Pfeiffer, Albizzate (IT); Mauro Tenconi, Albizzate (IT); Eva Baldaro, Albizzate (IT); Valentina Langella, Albizzate (IT); Giovanni Floridi, Albizzate (IT); Giuseppe Li Bassi, Albizzate (IT)

(73) Assignee: Lamberti SpA, Albizzate (IT)

( * ) Notice: Subject to any disclaimer, the term of this patent is extended or adjusted under 35 U.S.C. 154(b) by 227 days.

(21) Appl. No.: 12/986,785

(22) Filed: Jan. 7, 2011

(65) Prior Publication Data

US 2011/0166341 A1    Jul. 7, 2011

(51) Int. Cl.
    *C08B 37/00*      (2006.01)
    *C07H 1/00*      (2006.01)
    *C07H 3/00*      (2006.01)

(52) U.S. Cl.
    USPC .......................................... 536/114; 536/124

(58) Field of Classification Search
    None
    See application file for complete search history.

(56) References Cited

U.S. PATENT DOCUMENTS

| | | | |
|---|---|---|---|
| 3,297,583 A | | 1/1967 | Dierichs et al. |
| 3,350,386 A | | 10/1967 | Engelskirchen et al. |
| 4,061,602 A | | 12/1977 | Oberstar et al. |
| 5,202,048 A | * | 4/1993 | Bartolo et al. ............ 510/151 |
| 5,935,589 A | * | 8/1999 | Mukherjee et al. ......... 424/401 |
| 2004/0019982 A1 | * | 2/2004 | Pratt et al. .................... 8/405 |
| 2004/0167326 A1 | * | 8/2004 | Brackhagen et al. ........ 536/120 |
| 2010/0004197 A1 | * | 1/2010 | Baldaro et al. .............. 514/54 |

FOREIGN PATENT DOCUMENTS

| | | |
|---|---|---|
| CA | 2023324 A1 | 8/1990 |
| CA | 2063365 A1 | 3/1992 |
| EP | 1490408 A1 | 12/2004 |
| EP | 1490410 A1 | 12/2004 |
| WO | WO 03/078473 A1 | 9/2003 |
| WO | WO 2008/058768 A1 | 5/2008 |
| WO | WO 2008/058769 A1 | 5/2008 |

OTHER PUBLICATIONS

Mao, N. H. et al., "Estimation of In-Situ Stresses from Ultrasonic Measurements," Lawrence Livermore Natl. Laboratory; SPE Fomration Evaluation, Oct. 1996.

* cited by examiner

*Primary Examiner* — Layla Bland
(74) *Attorney, Agent, or Firm* — Mossman, Kumar & Tyler, PC

(57) ABSTRACT

A glyoxal and boron free purified cationic polygalactomannan may be prepared by reacting a polygalactomannan flour, a nonionically derivatized polygalactomannan flour, or a mixture thereof, with a cationising reagent, adjusting the pH to be from about 4 to about 6; cross-linking the cationic with glyoxal, and filtering and water washing the cationic polygalactomannan to produce a glyoxalated purified cationic polygalactomannan containing not more than 70% by weight of water. In some cases it may be desirable to introduce a buffering agent to the glyoxalated purified cationic polygalactomannan to regulate the pH to from 8.0 to about 9.5, when measured at 1% (dry matter) in water. In other cases, it may be desirable to remove water to produce glyoxal free purified cationic polygalactomannan in powder form. Such compounds are particularly useful in personal care products.

5 Claims, No Drawings

US 8,580,952 B2

GLYOXAL FREE PURIFIED CATIONIC POLYGALACTOMANNAN

CROSS-REFERENCE TO RELATED PATENT APPLICATIONS

This application claims priority from Italian patent application no.: IT VA2010A000002 filed Jan. 7, 2010 the disclosure of which is incorporated herein by reference.

BACKGROUND

1. Field of the Disclosure

The application relates to purified, light colored cationic polygalactomannan and to a method for its preparation. The application particularly relates to purified, light colored, glyoxal and boron free cationic polygalactomannan and to a method for its preparation.

2. Background of the Disclosure

Polygalactomannans and their derivatives are known to be useful in many applications such as oil recovery, personal care products, coating applications, textile applications, paper applications, and the like. In some instances, polygalactomannans and their derivatives may be difficult to disperse in aqueous solutions, as they may form sticky particles which clump and agglomerate, making dissolution difficult. To improve dissolution of the polymers, crosslinking agents, such as borax and glyoxal have been used.

The use of such cross-linking agents may not always be desirable. Especially in situations where the polygalactomannans may be employed in personal care products, it may be desirable to eliminate both boron and glyoxal.

The first use of cationic guar derivatives in cosmetics goes back to 1977, when a cationic derivative of guar was used in the preparation of a so-called "two in one" shampoo, having hair conditioning characteristics beside the normal detergent power (see U.S. Pat. No. 4,061,602).

SUMMARY

In one aspect, the invention is a method for preparing glyoxal free purified cationic polygalactomannan including reacting a polygalactomannan flour, a nonionically derivatized polygalactomannan flour, or a mixture thereof, with a cationising reagent to form a first composition including a cationic polygalactomannan; adjusting the pH of the first composition to be from about 4 to about 6; cross-linking the cationic polygalactomannan by reacting the cationic polygalactomannan with glyoxal, and filtering and water washing the cationic polygalactomannan to produce a glyoxalated purified cationic polygalactomannan containing not more than 70% by weight of water; wherein the glyoxalated purified cationic polygalactomannan has a cationic DS of from about 0.01 to about 1.0. In some cases it may be desirable to introduce a buffering agent to the glyoxalated purified cationic polygalactomannan to regulate the pH of the glyoxalated purified cationic polygalactomannan to from about 8.0 to about 9.5, when measured at 1% (dry matter) in water. In other cases, it may be desirable to remove water from the glyoxalated purified cationic polygalactomannan to produce glyoxal free purified cationic polygalactomannan in powder form.

In another aspect, the invention it is a glyoxal free purified cationic polygalactomannan: a) having a cationic DS of from about 0.01 to about 1.0; b) having a Yellowness Index of less than 35, as determined by standard method ASTM E313-00 after sieving through 100 mesh, c) having a has Brookfield viscosity higher that 500 mPa*s at 1% by weight, 25° C., 20 rpm; and d) including from 0.3 to 3 wt % of glycolic acid in salt form.

DESCRIPTION

The cationic polygalactomannan obtained by the method of the application yields viscous aqueous solution and it is particularly useful as an ingredient for cosmetics and personal care products, pet care products, pharmaceuticals and household cleaning products, being free from boron, glyoxal, other cross-linkers and noxious impurities. These cationic polygalactomannan are especially useful as an effective thickening agent both at acidic and basic pH.

Cationic polysaccharides are derivatives of natural origins very used as industrial additives due to their conditioning properties (i.e. they improve the characteristics of the substrate, generally paper, skin, hair or fabric, to which they are applied on). Beside their conditioning power, the capability of these polysaccharides to thicken and regulate the rheology of the solutions in which they are dissolved is industrially useful. These characteristics render them industrially useful for the preparation of shampoos, hair conditioners, creams, personal or household care detergents and softeners that confer a soft touch and antistatic properties to fabrics.

In particular, cationic polygalactomannans, and, among them, cationic derivatives of guar gum, have shown excellent results in improving the wet and dry compatibility of hair washed with a shampoo or treated after washing with a conditioner formulated therewith. It is well known that, in cosmetic formulations, the presence of materials not expressly added and controlled, and/or that are not predictable or have variable properties from batch to batch, even if in minimal amounts, can create problems during the preparation of the formulation, such as phase separation and variations of the viscosity.

During the last few years, particular attention has been placed to the toxicity of raw materials used for the fabrication of cosmetic products. It is therefore of fundamental importance that, for the use in cosmetic formulations and in formulations that come into direct contact with skin, such as in household cleaning products, the cationic derivatives of polygalactomannans are as much as possible devoid of impurities, both for the consumer's health and for technological problems connected with the production of cosmetics.

The simplest cationic guar derivative used in cosmetic is known with the INCI name of Guar Hydroxypropyltrimonium Chloride and, chemically, is guar 2-hydroxy-3-(trimethylammonium)propyl ether chloride. Other cationic guar derivatives are characterized by the further presence of non-ionic groups, such as hydroxypropyl, hydroxylbutyl and/or hydrophobic hydroxyalkyl and/or alkyl groups.

Some of the cationic guar derivatives currently on the market, in order to obviate to the difficulty and to the burden connected with the purification by washings with water and solvents, are purified from reaction by-products by crosslinking with borates and washing with water only, as described for example in CA 2,023,324, where in the reaction phase borax is added; the resulting cationic guar derivatives contain small amounts of boron (borated guars). The limit of borated cationic guar derivatives is their exclusive applicability to products to be used at acidic or slightly acidic pH, because products treated with borates are not soluble at pH greater than 7; moreover, boric acid derivatives have been recently classified as substances toxic for reproduction.

Glyoxalation procedures (cross-linking with glyoxal and washing) have been known for a long time (for example from U.S. Pat. No. 3,297,583, U.S. Pat. No. 3,350,386, CA 2,063,365 and WO 2008/058768) and represent useful methodologies to purify natural polymers. Although glyoxal itself may act as irritant in case of skin or eye contact, the glyoxal content of cosmetics formulations containing purified glyoxal cross-linked cationic guar can be considered negligible if below 100 ppm. Anyway the constantly increasing attention to the safety of consumers renders desirable in the cosmetic field to provide a cationic purified guar which is also free from glyoxal.

A useful method to obtain purified, cross-linker free, cationic guar has been developed in WO 2008/058769. Nevertheless, it makes use of solvents that necessitate an explosion proof industrial apparatus and additional costs for the recycling. There is therefore still the necessity to have a product free of potentially irritating contaminants, having very good quality in terms of viscosity, odor and color, easy to produce with standard industrial equipments.

It is known from literature that at basic pH glyoxal is irreversibly transformed into glycolic acid or salt thereof; glycolic acid and its salts are considered safe and its use is not restricted in any way. It is also known from CA 2,063,365 that glyoxal can be removed from derivatised polygalactomannan splits by treatment with a base at pH of at least 10; suitable bases according to CA 2,063,365 include metal hydroxides, amines and ammonia. Unfortunately, when the treatment according to CA 2,063,365 is performed on cationic guar derivatives, it provides dark and bad-smelling products having remarkably reduced thickening performances.

It has now been found that by treating purified glyoxalated cationic polygalactomannans with a buffering agent at pH from 8.0 to 9.5 a glyoxal free light colored product is obtained which is capable of producing viscous solutions upon dissolution in water. It is therefore an object of this application to claim a procedure for the preparation of a glyoxal free purified cationic polygalactomannan having cationic DS comprised between 0.01 and 1 comprising the following steps: a) polygalactomannan flour or nonionically derivatized polygalactomannan flour is reacted with a cationising reagent; b) the pH is adjusted between 4 and 6, the cationic polygalactomannan is cross-linked by reaction with glyoxal, washed by addition of water and filtered to provide a glyoxalated purified cationic polygalactomannan containing not more than 70%, preferably from 60 to 40%, by weight of water; c) a buffering agent is added to the glyoxalated purified cationic polygalactomannan to regulate the pH of the product from 8.0 to 9.5, when measured at 1% (dry matter) in water; d) excess water is removed to provide glyoxal free purified cationic polygalactomannan in powder form.

Another object of this application is to claim a glyoxal free purified cationic polygalactomannan, obtainable from the above procedure, having cationic DS comprised between 0.01 and 1 and characterized by the fact that it has a Yellowness Index of less than 35, as determined by standard method ASTM E313-00 after sieving through 100 mesh, contains from 0.3 to 3% wt of glycolic acid in salt form and has Brookfield viscosity higher that 500 mPa*s at 1% by weight, 25° C., 20 rpm.

Still another object of this application is to claim a cosmetic, personal care, home care, pharmaceutical, oilfield, paper, textile, coating or industrial cleaning chemical composition including the glyoxal free purified cationic polygalactomannan produced by the above described method.

Polygalactomannans (also called galactomannans) are polysaccharides consisting of a mannose backbone with galactose side groups (more specifically, a (1-4)-linked beta-D-mannopyranose backbone with branch points from their 6-positions linked to alpha-D-galactose, i.e. 1-6-linked alpha-D-galactopyranose). They may be obtained from the endosperms of seeds of leguminosae, such as *Trigonella foenum-graecum* (fenugreek gum), *Cyamopsis tetraglonoba* (guar gum), *Cesalpinia spinosa* (tara gum), *Ceratonia siliqua* (locust bean gum or carob gum), *Cassia tora* and *Cassia obtusifolia* (cassia gum). Polygalactomannans differ from one another in the number of mannose-to-galactose ratio. In order of increasing number fenugreek gum has a mannose:galactose ratio of ~1:1, guar gum has a ratio of ~2:1, tara gum has a ratio of ~3:1, locust bean gum or carob gum has a ratio of ~4:1 and cassia gum has a ratio of ~5:1.

Step a), as designated above, comprises the introduction of cationic substituents on commercially available polygalactomannan flour or on non-ionically derivatized polygalactomannan flour having non-ionic molar substitution from 0.1 to 3.0 by reaction of the polygalactomannan flour with tertiary amino or quaternary ammonium alkylating agents, in the presence of basic catalysts (typically sodium hydroxide). The cationic modification is well known to the person skilled in the art. In some embodiments, the polygalactomannan is preferably from guar.

The cationic substituents of the polygalactomannans are introduced by the reaction of part of their hydroxyl groups with the tertiary amino or quaternary ammonium alkylating agents. Examples of useful alkylating agents include, but are not limited to, glycidyltrialkylammonium salts and 3-halo-2-hydroxypropyltrialkylammonium salts such as glycidyltrimethylammonium chloride, glycidyltriethylammonium chloride, gylcidyltripropylammonium chloride, glycidylethyldimethylammonium chloride, glycidyldiethylmethylammonium chloride, and their corresponding iodides; 3-chloro-2-hydroxypropyltrimethylammonium chloride, 3-chloro-2-hydroxypropyltriethylammonium chloride, 3-chloro-2-hydroxypropyltripropylammonium chloride, and 3-chloro-2-hydroxypropylethyldimethylammonium chloride, and their corresponding iodides. Still other examples of useful alkylating agents include quaternary ammonium compounds such as halides of imidazoline ring containing compounds.

In a typical embodiment, the polygalactomannan is guar gum and the cationising alkylating agent is 3-chloro-2-hydroxypropyltrimethylammonium chloride or 2,3-epoxypropyl trimethylammonium chloride. The cationic substituent is in this case 2-hydroxy-3-trimethylammoniumpropyl ether chloride.

In some embodiments the resulting cationic polygalactomannans have cationic degree of substitution ($DS_C$) from 0.1 to 0.5. In the present text, with the expression "cationic degree of substitution," it is meant the molar cationic degree of substitution on the hydroxyl groups of the polygalactomannan measured by means of $^1$H-NMR.

In embodiments of the method of the application where the final glyoxal free purified cationic polygalactomannan further contain non-ionic groups, such as hydroxyethyl, 2-hydroxybutyl and/or 2-hydroxypropyl substituents, a nonionically derivatized polygalactomannan flour may be used in step a). Alternatively, in another embodiment, the non-ionic groups may also be introduced after step a).

The non-ionic molar substitution degree of the polygalactomannans may range from 0.1 to 3 and, in some embodiments, 2-hydroxypropyl is a desirable non-ionic substituent.

With the expression "non-ionic molar degree of substitution" (MS) it is meant the molar non-ionic degree of substitution on the hydroxyl groups of the polygalactomannan; the MS is also measured by means of $^1$H-NMR.

In the embodiments where the final glyoxal free purified cationic polygalactomannan further contains hydrophobic substituents, i.e. substituents including $C_{12}$-$C_{32}$ alkyl or alkenyl groups, the hydrophobic modification precedes step a). The hydrophobic degree of substitution ($DS_{HB}$) of the final glyoxal free purified cationic galactomannan may vary between 0.0001 and 0.01 as determined by gas-chromatography.

It is remarked that the use of polygalactomannan in the form of flour is useful in the method of the application in order to obtain the characteristics of purity which are typical of the cationic polygalactomannan of the application. The polygalactomannan flour useful for obtaining the cationic polygalactomannan of the application has a molecular weight typically of between 50,000 and 2,000,000; also the cationic polygalactomannan of the application has a molecular weight between 50,000 and 2,000,000.

Step a) is generally carried out in a water or water alcohol/mixture. In the practice of the method of the disclosure, the alcohol may be methanol, ethanol, isopropanol, n-propanol, n-butanol and the like, isopropanol and ethanol being preferred in some embodiments. Further, also in step a) of the method of the disclosure, from 30 to 200 parts by weight of a water/alcohol mixture containing less than 50% wt of water may be used with each 100 parts by weight of flour.

Step b) is, in some embodiments, preferably performed by adding from 2.2 to 3 parts by weight of glyoxal for each 100 parts of polygalactomannan flour, reacting for approximately 30 minutes, and washing with from 300 to 1200 parts by weight of ambient temperature water for from 10 to 90 minutes to obtain a glyoxalated purified cationic guar having a moisture content below 70% wt, by filtration. In some embodiments, these properties may be achieved by additional pre-drying.

The upper content of water in the glyoxalated purified cationic polygalactomannan obtained at the end of step b) may be important because excess water may cause gelling of the product in the subsequent step. Further detail for efficiently performing step b) can be found in EP 1,490,408 and EP 1,490,410.

Step c) is also an important and characterising step of the method of the application. The buffering agent used to disproportionate the cross linked glyoxal is, in some embodiments, added dissolved in water, as an aqueous solution. Alternatively, in other embodiments, the buffering agent maybe added as a powder or pre-dispersed in a inert liquid medium, for example in a low boiling alcohol. With the expression "buffering agent." It is meant an inorganic or organic compound, or mixture of compounds, which is capable to produce a buffered reaction medium by addition to the slightly acidic purified glyoxalated cationic guar obtained from step b). Phosphoric acid alkali metal salts are also useful as buffering agent in step c).

When sodium hydrogen carbonate and disodium carbonate is the buffering agent, the final glyoxal free cationic galactomannans contains carbonate and sodium ions that do not adversely affect the performance of the product and can be used with no restrictions. Other organic or inorganic buffering agents can be used, properly choosing the salt/acid ratio, by way of example: Bicine, TRIS, TRIZMA, HEPBS, TAPS, AMPD, TABS, AMPSO, CHES, CAPSO, AMP, Ammonia, Barbital, and Glycine.

The water content in the reaction mixture of step c) may be important. In most embodiments, it should be high enough to dissolve the buffering agent but not exceed 70% by weight to avoid undesired gelling of the mass. In step c), in some embodiments particular preference is given to the combined use of alkali metal hydrogen carbonate, e.g. sodium hydrogen carbonate and a di(alkali metal) carbonate, e.g. disodium carbonate; a 20/80 (wt/wt) hydrogen carbonate/disodium carbonate mixture is most preferably used.

The treatment of step c) may be made at ambient temperature, for example at about 25° C., although advantageously the temperature may be increased up to 70° C., and most preferably up to about 50° C., while still obtaining satisfactory results.

The cross-linking and washing of step b) allows for the elimination of at least 90% of the reaction by-products and, possibly, of the by products deriving from the introduction of non-ionic substituents of the polygalactomannan. As a consequence, the method of the disclosure finally provides a purified glyoxal free cationic polygalactomannan. With the expression "purified" polygalactomannan, it is meant a polygalactomannan containing less than 0.35% of reaction by-products. By "reaction by-products," is meant residues of cationising and alkylating agents, their hydrolysis derivatives and glycols (water, alcohol, buffering agent and glycolic acid residues are excluded).

Particularly, the glyoxal free cationic polygalactomannan of the application is free from 3-chloro-2-hydroxypropyltrimethylammonium chloride (the cationising agent which is preferably used for the synthesis of the cationic guar) and contains less than 0.2% by weight of 2,3-dihydroxypropyl trimethylammonium chloride (possibly formed by the reaction of 3-chloro-2-hydroxypropyltrimethylammonium chloride with water during the cationising reaction).

The determination of the cationising reagent residues and its correlated glycol is carried out by means of ion exchange chromatography, by the use of a cationic exchange column and elution with methane sulphonic acid solution. With the expression "free from 3-chloro-2-hydroxypropyl trimethylammonium chloride," is meant that in the cationic guar the concentration of 3-chloro-2-hydroxypropyl trimethylammonium chloride is below the detection limit of the above described method (in this case below 0.15%).

Step c) provides a purified glyoxal free cationic polygalactomannan containing from 0.3 to 3% by weight of glycolic acid in salt form that derives from disproportionation of glyoxal. An acidification or neutralization step may optionally be performed after step c).

With the expression "glyoxal free" polygalactomannan, it is meant a polygalactomannan containing less than 0.01% wt of glyoxal, the glyoxal content being determined by reaction with 2-hydrazono-2,3-dihydro-3-methylbenzothiazole chlorohydrate, according to the method described in "Kunststoffe im Lebensmittelverkehr" Ed. Carl Heymanns, Verlag K G, 1999, page 228-231.

The limited presence of glycolic acid in the purified glyoxal free cationic polygalactomannan of the application can be advantageous when cosmetic use is envisaged because glycolic acid already finds applications in skin care products and is used to improve the skin's appearance and texture. It is known that it may also reduce wrinkles, acne scarring, hyperpigmentation and many other skin conditions, including actinic keratosis, hyperkeratosis, and seborrheic keratosis.

The purified cationic polygalactomannan of the application is also boron free. With the expression "boron free" polygalactomannan, it is meant a polygalactomannan containing less than 30 ppm of borate.

Advantageously, the method of the application provides a glyoxal free purified cationic polygalactomannan having viscosity characteristics which are similar to those of the intermediate glyoxalated purified cationic polygalactomannan, i.e. its Brookfield viscosity at 1 wt % active matter (a.m.), 25°

C. and 20 rpm is not less than 70% the viscosity of that intermediate in the same conditions.

In some embodiments, the Brookfield viscosity of the boron and glyoxal free purified cationic polygalactomannan of the application is desirably higher than 800 mPa·s. In other embodiments, the viscosity is from 1,000 to 5,000 mPa*s at 1% by weight, 25° C., 20 rpm.

The method of the application provides almost colourless and odorless boron and glyoxal free purified cationic polygalactomannans, and in particular light coloured and odorless boron and glyoxal free purified cationic guars, that display solubility in both acid and basic aqueous solution and give readily viscous aqueous solutions. While not wishing be bound by any theory, it is believed that the buffered pH between 8.0 and 9.5 is essential both for obtaining a final polygalactomannan with Yellowness Index below 35 and for substantially maintaining unaltered the thickening performance of the intermediate glyoxalated cationic polygalactomannans. The colour of the glyoxal free purified cationic polygalactomannans is determined by standard ASTM E313-00 after sieving through 100 mesh, to avoid misreading.

The product obtained by means of the method of the application can be used in the most different formulations, where its capability to bind through its positive charges to substrates having weak negative charges, together with its capability to thicken and to regulate the rheology of water solutions are exploited. The purified glyoxal free cationic polygalactomannans are particularly useful as ingredients of cosmetic compositions and household cleaning products. With the expression "cosmetic compositions," it is meant the products normally used for personal care, such as hair care, skincare, sun care and oral care compositions.

Examples of cosmetic compositions include but are not limited to: body, hands and face creams, hair gels and lotions (such as hair setting lotions, fixing and styling compositions, balms) hair coloring and bleaching creams, sunscreen compositions, make-up products (such as lipsticks, foundations, mascaras, eye-liners), cleansing, moisturizing and perspiring fluids, shampoos, perfumes, cleansing soaps and bars, toothpastes, mouthwashes, and other products for similar applications.

Household cleaning products include, but are not limited to: hard surface cleaning gels, bars, emulsions and liquid compositions, dry or damp dusting, cleaning and/or disinfecting wipes, fabric detergents and conditioners.

The purified glyoxal free cationic polygalactomannan of the application improves the deposition on hair and skin of the fatty ingredients of cosmetic compositions, such as oils, vitamins and emollients, and the persistence of their perfumes and fragrances, while providing effective conditioning and thickening effect. They are easily dispersible and soluble in water, even in the presence of salts, and their thickening effect is not impaired by the presence of surfactants, which are normally present in cosmetic compositions and household cleaning products. They are also present in cosmetic compositions and household cleaning products in concentrations preferably ranging from 0.01 to 10% by weight relative to the total weight of the product, and more preferably from 0.05 to 2% by weight.

The cosmetic products of the application contain the usual ingredients, such as surfactants, moisturizers, emollients, sunscreens, hydrophilic or lipophilic active agents such as ceramides, anti-free-radical agents, insect repellents, skin coolants, deodorants, antiperspirant actives, hair treatment agents, oral care agents, slimming agents, bactericides, sequestering agents, antidandruff agents, antioxidants, preserving agents, basifying or acidifying agents, fragrances, fillers, dyestuffs, other polymers and emulsifiers, gelling agents, foaming agents, fatty substances.

Also, the household cleaning products comprise the ingredients conventionally used in the field, such as surfactants, emollients, insect repellents, bactericides, sequestering agents, antioxidants, preserving agents, basifying or acidifying agents, fragrances, fillers, dyestuffs, other polymers and emulsifiers, gelling agents, foaming agents, deodorizers, insecticides, cleaning agents, disinfectants, softeners, laundry detergents, dishwashing detergents. The cosmetic and household cleaning products of the application may also contain an acceptable medium, which, according to the final use of the product, is usually compatible with any keratin substance, such as skin, nails, hair, wool and the like. The acceptable medium may represent from 5% to 98% of the total weight of the product. In at least one embodiment, the typical acceptable medium is water.

Acceptable organic solvents may replace or partly substitute the water. The organic solvents may be hydrophilic organic solvents, lipophilic organic solvents, amphiphilic solvents or mixtures thereof. Examples of hydrophilic organic solvents, include but are not limited to: linear or branched lower monoalcohols having from 1 to 8 carbon atoms, such as ethanol, propanol, butanol, isopropanol and isobutanol; polyethylene glycols having from 6 to 80 ethylene oxides; polyols such as propylene glycol, butylene glycol, glycerol and sorbitol; mono- or dialkyl isosorbide in which the alkyl groups have from 1 to 5 carbon atoms, such as dimethyl isosorbide; glycol ethers such as diethylene glycol monomethyl or monoethyl ether and propylene glycol ethers such as dipropylene glycol methyl ether. Polyols such as polypropylene glycol (PPG); derivatives, such as fatty acid esters of polypropylene glycol and fatty alcohol ethers of PPG may be used as utilisable amphiphilic organic solvents. Utilisable lipophilic organic solvents include, for example, fatty alcohols and fatty esters such as diisopropyl adipate, dioctyl adipate and alkyl benzoates.

The cosmetic and household cleaning products of the application may be in the form of solution, emulsion, dispersion, gel, cream, paste, powders, bar or wet wipe. They may contain an oil, such as a mineral oil, a vegetable oil, an animal oil, a synthetic oil or mixture thereof. Examples of utilisable oils are paraffins, liquid petroleum jelly, jojoba oil, coconut oil, sweet almond oil, olive oil, rapeseed oil, castor oil, sesame oil, avocado oil, groundnut oil, and isoparaffins.

The cationic polygalactomannans of the application is also useful in other industrial fields, especially where the purity characteristics of the product are of particular importance, as for example in the oil field and in the paper industry.

EXAMPLES

The following examples are provided to illustrate the invention. The examples are not intended to limit the scope of the invention and they should not be so interpreted. Amounts are in weight parts or weight percentages unless otherwise indicated.

Preparation of Purified Glyoxalated Cationic Guar

In a 5 liters stirred reactor, 800 g of guar flour and 450 g of a 3/7 water/isopropanol solution are loaded at room temperature, the reaction atmosphere is made inert by means of vacuum/nitrogen washings, and under vigorous stirring 100 g of sodium hydroxide dissolved in 235 g of water solution are added. The stirring is continued for 30 minutes at a temperature of about 50° C.; 470 g of 3-cloro-2-hydroxypropyl trimethylammonium chloride 65% are added. After 2 hours at the same temperature the reaction mixture is cooled off to 40° C. and neutralised by addition of acetic acid to pH about 5.

50 g of glyoxal (40% in water) are added, and left to react for about 1 hour keeping the temperature at about 40° C. The so obtained reaction mixture (glyoxalated raw cationic guar), is dispersed in 4,000 g of tap water, left under stirring for 10 minutes, then filtered under vacuum (0.4-0.5 atm) on a fabric filter.

The filtered product is washed with 4,000 g of tap water, adding this last washing directly on the wet product present on the filter and applying vacuum, to obtain a purified cationic guar glyoxalated having $DS_C$=0.26.

Example 1

100 g of the purified glyoxalated cationic guar are treated at 25° C. with 6.5% by weight on weight of the dry product of $Na_2CO_3/NaHCO_3$ 80/20 (wt/wt) dissolved in water and mixed for 1 hour. The pH of the guar during the reaction (at 1% by weight in water) is 8.8. The product is dried on a fluid bed drier using hot air until the humidity content is about 7% by weight, milled and analysed.

Example 2-5

The procedure of Example 1 was repeated but replacing the $Na_2CO_3/NaHCO_3$ 80/20 with the salts reported in The Table.

Example 6

Blank 100 g of the wet purified cationic guar glyoxalated are dried on a fluid bed drier using hot air until the humidity content is about 7% by weight, milled and analysed. The glyoxal content is 0.6% by weight. The Brookfield viscosity at 1% by weight a.m. is 2,600 mPa·s (25° C., 20 rpm). In the Table, the values of the analytical determinations performed on the final products of the Examples 1-6 are reported.

TABLE 1

| Ex. | Salt | Q % wt[1] | pH[2] | glyoxal % wt[3] | C[4] | V[5] | By-p % wt[6] |
|---|---|---|---|---|---|---|---|
| 1 | $Na_2CO_3$/ $NaHCO_3$ 80/20 | 6.5 | 8.8 | <0.01 | 33 | 2,230 | <0.35 |
| 2 | $Na_3PO_4$ | 8.0 | 9.0 | <0.01 | 32 | 1,910 | <0.35 |
| 3* | $Na_3PO_4$ | 10 | 10 | <0.01 | 40 | 1,100 | <0.35 |
| 4* | $Na_2HPO_4$ | 10 | 7.7 | 0.6 | 28 | 1,640 | <0.35 |
| 5* | NaOH | to pH | 11 | <0.01 | 45 | 200 | <0.35 |
| 6** | none | — | — | 0.6 | 24 | 2,600 | <0.35 |

[1] amount of salt used based on dry matter of glyoxalated purified cationic guar
[2] pH of a 1% by weight aqueous solution of the reaction mixture
[3] glyoxal content in the final product
[4] colour (Yellowness Index according to ASTM E313-00, passed through 100 mesh sieve)
[5] Brookfield viscosity in mPa*s, 1% (a.m.) 25° C., 20 rpm
[6] content of reaction by products in the final product
*comparative
**blank

The invention claimed is:

1. A method for preparing glyoxal free purified cationic polygalactomannan comprising:
    reacting a polygalactomannan flour, a nonionically derivatized polygalactomannan flour or a mixture thereof with a cationising reagent to form a first composition including a cationic polygalactomannan;
    adjusting the pH of the first composition to be from about 4 to about 6;
    cross-linking the cationic polygalactomannan by reacting the cationic polygalactomannan with glyoxal,
    filtering and water washing the cationic polygalactomannan to produce a glyoxalated purified cationic polygalactomannan containing not more than 70% by weight of water;
    introducing a buffering agent to the glyoxalated purified cationic polygalactomannan to regulate the pH of the glyoxalated purified cationic polygalactomannan to from 8.0 to about 9.5, when measured at 1% (dry matter) in water; and
    removing water from the glyoxalated purified cationic polygalactomannan to produce glyoxal free purified cationic polygalactomannan in powder form;
wherein the glyoxalated purified cationic polygalactomannan has a cationic DS of from about 0.01 to about 1.

2. The method of claim 1 wherein the polygalactomannan flour, the nonionically derivatized polygalactomannan flour, or mixture thereof is a guar flour.

3. The method of claim 1 wherein the cationic polygalactomannan is filtered to provide a glyoxalated purified cationic polygalactomannan containing from 60 to 40% by weight of water.

4. The method of claim 1 wherein a buffering agent is used to adjust regulate pH and is in the form of an aqueous solution.

5. The method of claim 4 wherein the buffering agent is a 20/80 (wt/wt) sodium hydrogen carbonate/disodium carbonate mixture.

* * * * *